United States Patent
Lu et al.

(10) Patent No.: US 9,250,089 B2
(45) Date of Patent: Feb. 2, 2016

(54) ELECTRONIC DEVICE AND VEHICLE NAVIGATION METHOD

(71) Applicant: Chiun Mai Communication Systems, Inc., New Taipei (TW)

(72) Inventors: Chia-Ching Lu, New Taipei (TW); Che-Ping Chang, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 0 days.

(21) Appl. No.: 14/473,018

(22) Filed: Aug. 29, 2014

(65) Prior Publication Data
US 2015/0066357 A1    Mar. 5, 2015

(30) Foreign Application Priority Data
Aug. 30, 2013  (CN) .......................... 2013 1 0388499

(51) Int. Cl.
*G01C 21/00*  (2006.01)
*G01C 21/28*  (2006.01)

(52) U.S. Cl.
CPC .................................. *G01C 21/28* (2013.01)

(58) Field of Classification Search
None
See application file for complete search history.

(56) References Cited

U.S. PATENT DOCUMENTS

| | | | |
|---|---|---|---|
| 8,930,141 B2* | 1/2015 | Wither ............... | G01C 21/3635 340/995.1 |
| 2013/0147837 A1* | 6/2013 | Stroila ................. | G06T 19/006 345/633 |
| 2013/0231857 A1* | 9/2013 | Beaurepaire .......... | G01C 21/20 701/428 |

* cited by examiner

*Primary Examiner* — Adam Alharbi
(74) *Attorney, Agent, or Firm* — Novak Druce Connolly Bove + Quigg LLP

(57) ABSTRACT

A navigation method for a vehicle includes receiving a destination inputted by a user and establishing a current position of a vehicle using a positioning device. Based on an electronic map, a route from the current position to the destination is determined and characteristic points of the determined route are extracted. A street view mapping of the determined route is acquired. Based on the street view mapping, and using a camera, a marker of each of the characteristic points is extracted using an image extraction method. When the vehicle arrives at each of the characteristic points, a prompt is output for the user by recognizing the marker of each of the characteristic points from the street view mapping.

15 Claims, 4 Drawing Sheets

ELECTRONIC DEVICE AND VEHICLE NAVIGATION METHOD

CROSS-REFERENCE TO RELATED APPLICATIONS

This application claims priority to Chinese Patent Application No. 201310388499.3 filed on Aug. 30, 2013 in the China Intellectual Property Office, the contents of which are incorporated by reference herein.

FIELD

Embodiments of the present disclosure relate to navigation technology.

BACKGROUND

A vehicle navigation system can display an electronic map on a display device for a user. While the user is driving a vehicle, the user may need to look at the electronic map to determine if any turns or other driving maneuvers are required.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
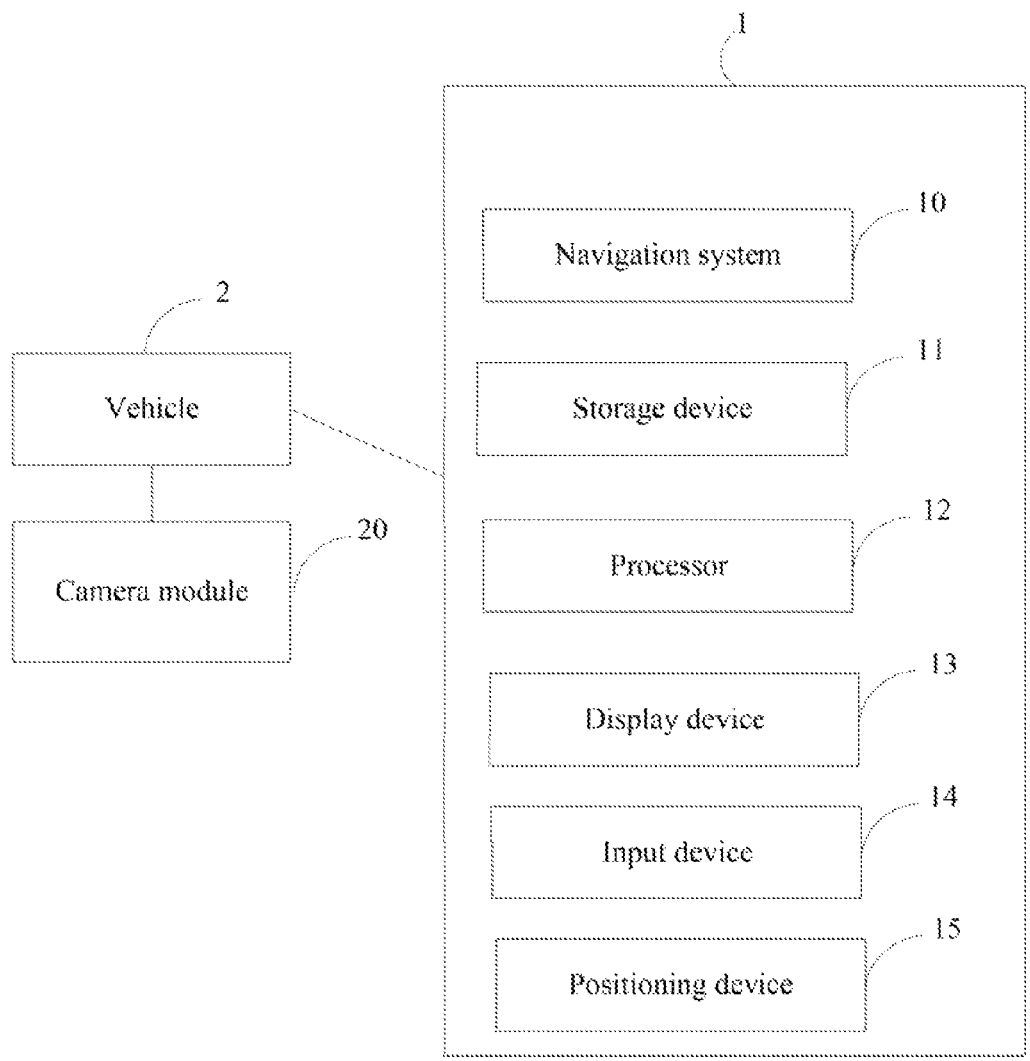
FIG. 1 is a block diagram of one embodiment of an electronic device including a navigation system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The present disclosure, including the accompanying drawings, is illustrated by way of examples and not by way of limitation. It should be noted that references to "an" or "one" embodiment in this disclosure are not necessarily to the same embodiment, and such references mean "at least one."

The term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY™, flash memory, and hard disk drives.

FIG. 1 illustrates an embodiment of an electronic device. Depending on the embodiment, the electronic device 1 can include a navigation system 10. The electronic device 1 is connected to a vehicle 2. A camera module 20 is also connected to the vehicle 2. In other embodiments, the camera module 20 can be included in the electronic device 1. The electronic device 1 includes, but is not limited to, a storage device 11, at least one processor 12, a display device 13, an input device 14, and a positioning device 15. The electronic device 1 can be a smart phone, a personal digital assistant (PDA), a tablet computer, or other electronic device. FIG. 1 illustrates only one example of the electronic device, other examples can include more or fewer components than as illustrated, or have a different configuration of the various components in other embodiments.

The navigation system 10 can provide navigation information (e.g., a navigation route) for a driver of the vehicle 2, can determine forking points and turn points of the navigation route, and can prompt or output information for the driver. When the vehicle 2 arrives at a turn point, the navigation system 10 can remind the driver to turn. When the vehicle 2 arrives at a forking point, the navigation system 10 can remind the driver to fork.

In at least one embodiment, the storage device 11 can include various types of non-transitory computer-readable storage mediums, such as a hard disk, a compact disc, a digital video disc, or a tape drive. The display device 13 can display images and videos. The input device 14 can be a mouse, a keyboard, or a touch panel, for user input.

Figure 2:
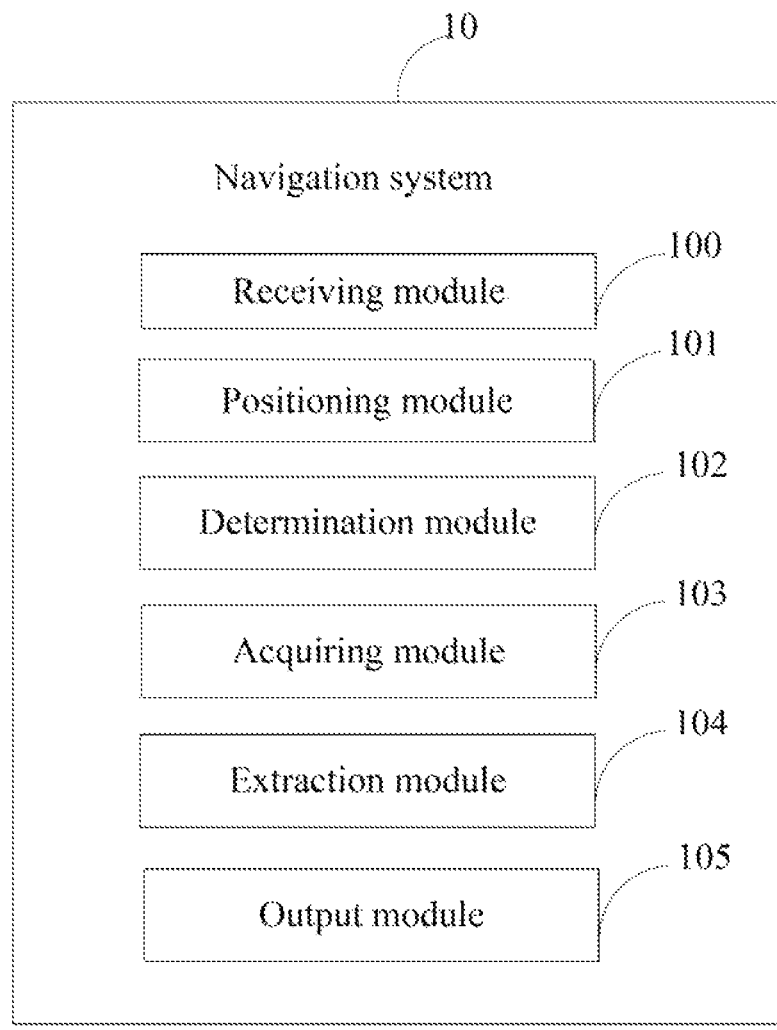
FIG. 2 is a block diagram of one embodiment of function modules of the navigation system in the electronic device of FIG. 1.

FIG. 2 is a block diagram of one embodiment of function modules of the navigation system. In at least one embodiment, the navigation system 10 can include a receiving module 100, a positioning module 101, a determination module 102, an acquiring module 104, an extraction module 103, and an output module 105. The function modules 100, 101, 102, 103, 104 and 105 can include computerized codes in the form of one or more programs, which are stored in the storage device 11. The at least one processor executes the computerized codes to provide functions of the function modules 100-105.

When a user inputs a destination on the display device 13, the receiving module 100 receives the destination inputted by the user.

The positioning module 101 positions a current position of the vehicle 2 using a positioning device 15 of the electronic device 1.

The determination module 102 determines a route from the current position to the destination based on an electronic map stored in the storage device 11. In at least one embodiment, the determination module 102 can display the electronic map on the display device 14 and highlight the determined route on the electronic map.

Figure 4:
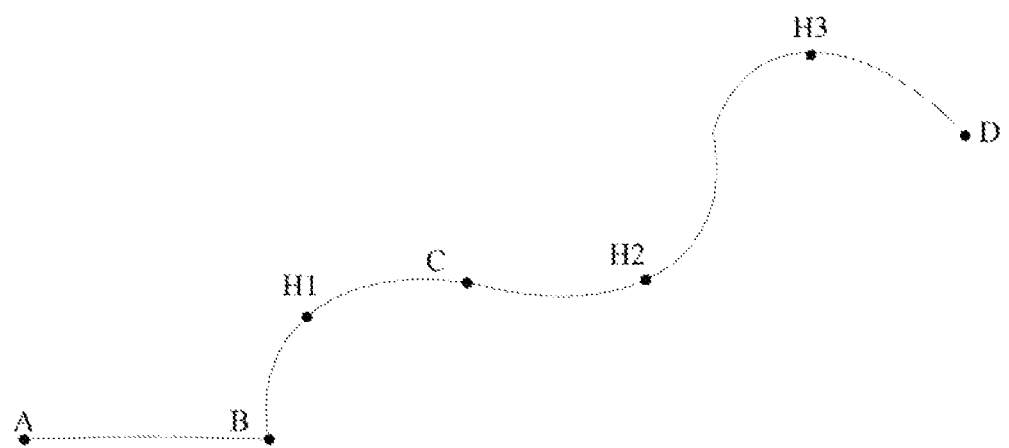
FIG. 4 illustrates a diagram of one embodiment of a labeled route.

The extraction module 103 extracts characteristic points of the determined route. The characteristic points includes forking points and turning points of roads along the determined route. In at least one embodiment, the determined route includes a plurality of roads. Each of the roads has a name. The extraction module 103 determines an intersection point of roads to be a forking point. For example, as shown in FIG. 4, a determined route includes a first road, a second road, and a third road. AB is the label of a first road, BC is the label of a second road, and CD is the label of a third road. A point B is an intersection point of the first road AB and the second road BC. The extraction module 103 determines the point B to be a forking point.

The extraction module 103 determines a curve based on the determined route. Based on the curve, the extraction module 103 determines a plurality of extreme points of the curve using a method of evaluating extreme values, and determines each of the extreme points to be a turn point. For example, as shown in FIG. 4, the extraction module 103 determines that the three extreme points H1, H2, and H3 are turning points.

The acquiring module 104 acquires a street view mapping of the determined route. In at least one embodiment, the acquiring module 104 can load the street view mapping of the determined route from a database of street view mappings through the Internet. The acquiring module 104 can simultaneously display the determined route and the street view mapping of the determined route.

The extraction module 103 extracts a marker of each of the characteristic points based on the street view mapping of the determined route using an image extraction method. In at least one embodiment, the image extraction method includes, but is not limited to, a Hough transformation, simultaneous auto-regressive model (SAR) and Fourier shape descriptors. The extraction module 103 highlights the marker of each of the characteristic points on the street view mapping of the determined route.

When the vehicle arrives at positions corresponding to each of the characteristic points, the output module 105 outputs a prompt for the user by recognizing the marker of each of the characteristic points from the street view mapping. In at least one embodiment, the output module 105 acquires scene images of the vehicle 2 from the camera module 20. Based on the acquired scene images, the output module 105 extracts image characteristics from the acquired scene images using an image extraction method. The output module 105 determines whether the vehicle 2 has arrived at a specified position by comparing the image characteristics of the acquired scene images and a marker of the specified position. When a similarity between one of the image characteristics of the acquired scene image and the marker of the specified position is greater than or equal to a first predetermined value, the output module 105 determines that the vehicle 2 has arrived at the specified position. When similarities between the image characteristics of the acquired scene images and the marker of the specified position are less than the first predetermined value, the output module 105 determines that the vehicle 2 has not yet arrived at the specified position.

In other embodiments, the output module 105 extracts image characteristics of the street view mapping of the determined route. The output module 105 determines whether the vehicle 2 is running on the determined route by comparing the image characteristics of the acquired scene images and the image characteristics of the street view mapping. When a similarity between the image characteristics of the acquired scene images and the image characteristics of the street view mapping is greater than or equal to a second predetermined value, the output module 105 determines that the vehicle 2 is running on the determined route. When the similarity between the image characteristics of the acquired scene images and the image characteristics of the street view mapping is less than the second predetermined value, the output module 105 determines that the current route on which the vehicle is driving is not the determined route. When the vehicle 2 is not running on the determined route, the output module 105 outputs a prompt to indicate that the vehicle 2 is not running on the determined route.

Figure 3:
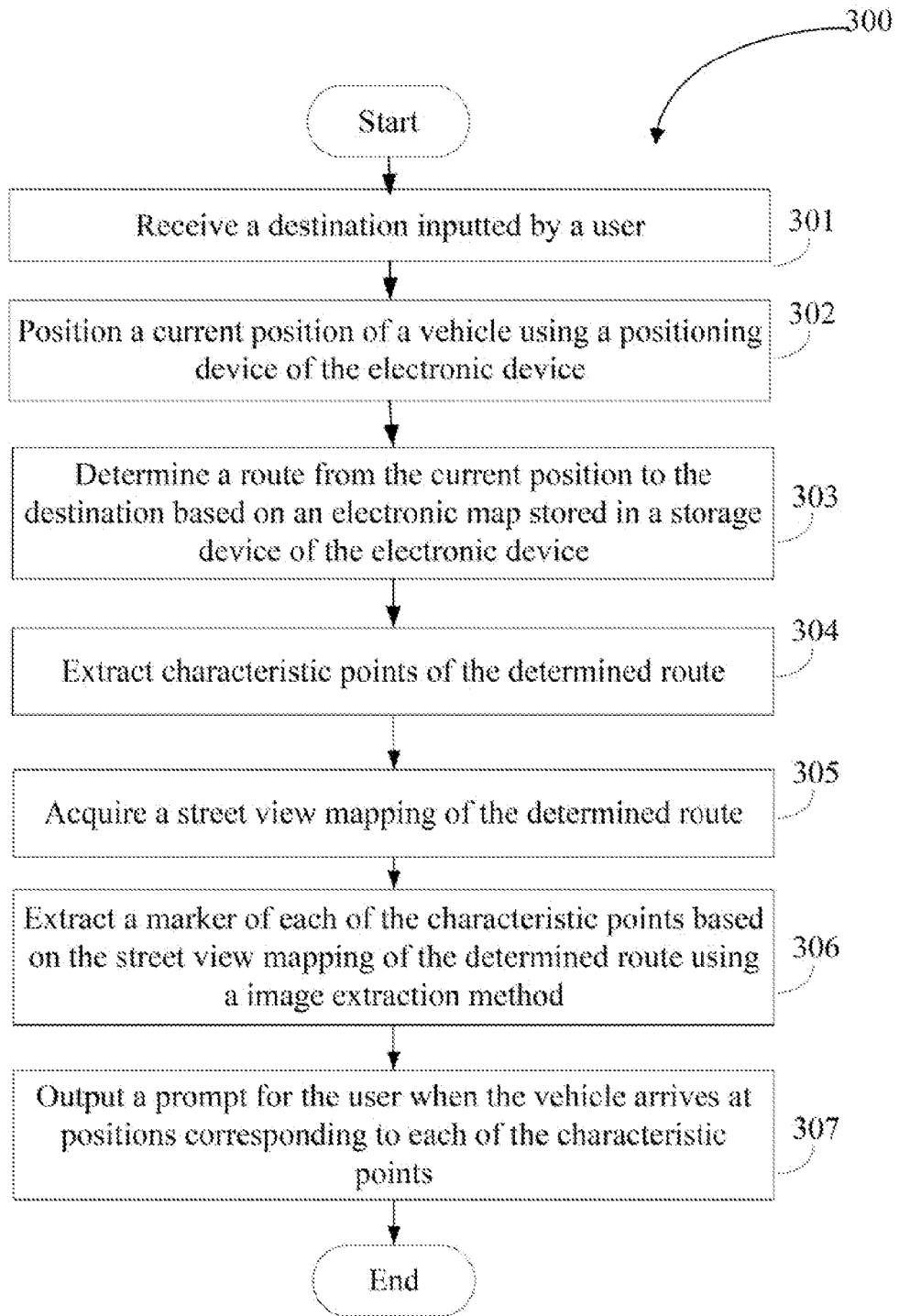
FIG. 3 illustrates a flowchart of one embodiment of a vehicle navigation method in the electronic device of FIG. 1.

FIG. 3 illustrates a flowchart of a method 300 in accordance with an example embodiment. The method 300 is provided by way of example, as there are a variety of ways to carry out the method 300. The method 300 described below can be carried out using the configurations illustrated in FIGS. 1 and 2, for example, and various elements of these figures are referenced in explaining method 300. Each block shown in FIG. 3 represents one or more processes, methods, or subroutines, carried out in the exemplary method 300. Additionally, the illustrated order of blocks is by example only and the order of the blocks can change according to the present disclosure. The exemplary method 300 can begin at block 301. Depending on the embodiment, additional steps can be added, others removed, and the ordering of the steps can be changed.

In block 301, when a user inputs a destination on a display device of an electronic device, a receiving module receives the destination inputted by the user.

In block 302, a positioning module positions a current position of a vehicle using a positioning device of the electronic device.

In block 303, a determination module determines a route from the current position to the destination based on an electronic map stored in a storage device of the electronic device. In at least one embodiment, the determination module can display the electronic map on the display device and highlight the determined route on the electronic map.

In block 304, an extraction module extracts characteristic points of the determined route. The characteristic points includes forking points and turn points of roads along the determined route. In at least one embodiment, the determined route includes a plurality of roads. Each of the roads has a name. The extraction module determines an intersection point of roads to be a forking point.

The extraction module determines a curve based on the determined route. Based on the curve, the extraction module determines a plurality of extreme points of the curve using a method of evaluating extreme value, and determines each of the extreme points to be a turn point.

In block 305, an acquiring module acquires a street view mapping of the determined route. In at least one embodiment, the acquiring module can load the street view mapping of the determined route from a database of street view mappings through the Internet. The acquiring module can simultaneously display the determined route and the street view mapping of the determined route.

In block 306, the extraction module extracts a marker of each of the characteristic points based on the street view mapping of the determined route, using an image extraction method. In at least one embodiment, the image extraction method includes, but is not limited to, a Hough transformation, a simultaneous auto-regressive model (SAR), and Fourier shape descriptors. The extraction module highlights the marker of each of the characteristic points on the street view mapping of the determined route.

In block 307, when the vehicle arrives at positions corresponding to each of the characteristic points, an output module outputs a prompt for the user by recognizing the marker of each of the characteristic points from the street view mapping. In at least one embodiment, the output module acquires scene images of the vehicle from a camera module. Based on the acquired scene images, the output module extracts image characteristics from the acquired scene images using the image extraction method. The output module determines whether the vehicle has arrived at a specified position by comparing the image characteristics of the acquired scene images and a marker of the specified position. When a similarity between one of the image characteristics of the acquired scene image and the marker of the specified position is greater than or equal to a first predetermined value, the output module determines that the vehicle has arrived at the specified position. When similarities between the image characteristics of the acquired scene images and the marker of the specified position are less than the first predetermined value, the output module determines that the vehicle has not yet arrived at the specified position.

In other embodiments, the output module extracts image characteristics of the street view mapping of the determined route. The output module determines whether the vehicle is running on the determined route by comparing the image characteristics of the acquired scene images and the image characteristics of the street view mapping. When a similarity between the image characteristics of the acquired scene images and the image characteristics of the street view mapping is greater than or equal to a second predetermined value, the output module determines that the vehicle is running on the determined route. When the similarity between the image characteristics of the acquired scene images and the image characteristics of the street view mapping is less than the second predetermined value, the output module determines that the current route on which the vehicle is driving is not the determined route. When the vehicle is not running on the determined route, the output module outputs a prompt to indicate that the vehicle is not running on the determined route.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. A computer-implemented vehicle navigation method using an electronic device, the method comprising:
   receiving a destination inputted by a user;
   positioning a current position of a vehicle using a positioning device of the electronic device;
   determining a route from the current position to the destination based on an electronic map stored in a storage device of the electronic device;
   extracting characteristic points of the determined route;
   acquiring a street view mapping of the determined route;
   extracting a marker of each of the characteristic points based on the street view mapping of the determined route using a image extraction method;
   outputting a prompt for the user when the vehicle arrives at positions corresponding to each of the characteristic points by recognizing the marker of each of the characteristic points from the street view mapping;
   acquiring scene images of the vehicle using a camera module;
   extracting image characteristics from the acquired scene images using the image extraction method;
   determining whether the vehicle arrives at a specified position by comparing the image characteristics of the acquired scene images and a marker of the specified position;
   when a similarity between one of the image characteristics of the acquired scene image and the marker of the specified position is greater than or equal to a first predetermined value, determining that the vehicle has arrived at the specified position; or when similarities between the image characteristics of the acquired scene images and the marker of the specified position are less than the first predetermined value, determining that the vehicle has not arrived at the specified position.

2. The method according to claim 1, further comprising: extracting image characteristics of the street view mapping of the determined route; determining whether the vehicle is running on the determined route by comparing the image characteristics of the acquired scene images and the image characteristics of the street view mapping; when a similarity between the image characteristics of the acquired scene images and the image characteristics of the street view mapping is greater than or equal to a second predetermined value, determining the vehicle is running on the determined route; when the similarity between image characteristics of the acquired scene images and the image characteristics of the street view mapping is less than the second predetermined value, determining the current route of the vehicle driving is not the determined route.

3. The method according to claim 2, further comprising:
   when the vehicle is not running on the determined route, outputting a prompt to indicate that the vehicle is not running on the determined route.

4. The method according to claim 1, wherein the characteristic points comprise forking points and turn points.

5. The method according to claim 1, further comprising displaying the acquired scene images, and displaying the street view mapping of the determined route according to the acquired scene images.

6. An electronic device comprising:
   a processor; and
   a storage device that stores one or more programs and, when executed by the at least one processor, cause the at least one processor to:
   receive a destination inputted by a user;
   position a current position of a vehicle using a positioning device of the electronic device;
   determine a route from the current position to the destination based on an electronic map stored in a storage device of the electronic device;
   extract characteristic points of the determined route;
   acquire a street view mapping of the determined route;
   extract a marker of each of the characteristic points based on the street view mapping of the determined route using a image extraction method;
   output a prompt for the user when the vehicle arrives at positions corresponding to each of the characteristic points by recognizing the marker of each of the characteristic points from the street view mapping;
   acquire scene images of the vehicle using a camera module;
   extract image characteristics from the acquired scene images using the image extraction method;
   determine whether the vehicle arrives at a specified position by comparing the image characteristics of the acquired scene images and a marker of the specified position;

when a similarity between one of the image characteristics of the acquired scene image and the marker of the specified position is greater than or equal to a first predetermined value, determine that the vehicle has arrived at the specified position; or when similarities between the image characteristics of the acquired scene images and the marker of the specified position are less than the first predetermined value, determine that the vehicle has not arrived at the specified position.

7. The electronic device according to claim 6, wherein the at least one processor is caused to: extract image characteristics of the street view mapping of the determined route; determine whether the vehicle is running on the determined route by comparing the image characteristics of the acquired scene images and the image characteristics of the street view mapping; when a similarity between the image characteristics of the acquired scene images and the image characteristics of the street view mapping is greater than or equal to a second predetermined value, determine the vehicle is running on the determined route; when the similarity between image characteristics of the acquired scene images and the image characteristics of the street view mapping is less than the second predetermined value, determine the current route of the vehicle driving is not the determined route.

8. The electronic device according to claim 7, wherein the at least one processor is caused to output a prompt to indicate that the vehicle is not running on the determined route when the vehicle is not running on the determined route.

9. The electronic device according to claim 6, wherein the characteristic points comprise forking points and turn points.

10. The electronic device according to claim 7, wherein the at least one processor is caused to display the acquired scene images, and display the street view mapping of the determined route according to the acquired scene images.

11. A non-transitory storage medium having stored thereon instructions that, when executed by a processor of an electronic device, causes the processor to perform a navigation method, wherein the method comprises:
  receiving a destination inputted by a user;
  positioning a current position of a vehicle using a positioning device of the electronic device;
  determining a route from the current position to the destination based on an electronic map stored in a storage device of the electronic device;
  extracting characteristic points of the determined route;
  acquiring a street view mapping of the determined route;
  extracting a marker of each of the characteristic points based on the street view mapping of the determined route using a image extraction method;
  outputting a prompt for the user when the vehicle arrives at positions corresponding to each of the characteristic points by recognizing the marker of each of the characteristic points from the street view mapping;
  acquiring scene images of the vehicle using a camera module;
  extracting image characteristics from the acquired scene images using the image extraction method;
  determining whether the vehicle arrives at a specified position by comparing the image characteristics of the acquired scene images and a marker of the specified position;
  when a similarity between one of the image characteristics of the acquired scene image and the marker of the specified position is greater than or equal to a first predetermined value, determining that the vehicle has arrived at the specified position; or when similarities between the image characteristics of the acquired scene images and the marker of the specified position are less than the first predetermined value, determining that the vehicle has not arrived at the specified position.

12. The non-transitory storage medium according to claim 11, the method comprises: extracting image characteristics of the street view mapping of the determined route; determining whether the vehicle is running on the determined route by comparing the image characteristics of the acquired scene images and the image characteristics of the street view mapping; when a similarity between the image characteristics of the acquired scene images and the image characteristics of the street view mapping is greater than or equal to a second predetermined value, determining the vehicle is running on the determined route; when the similarity between image characteristics of the acquired scene images and the image characteristics of the street view mapping is less than the second predetermined value, determining the current route of the vehicle driving is not the determined route.

13. The non-transitory storage medium according to claim 12, the method further comprises:
  when the vehicle is not running on the determined route, outputting a prompt to indicate that the vehicle is not running on the determined route.

14. The non-transitory storage medium according to claim 11, wherein the characteristic points comprise forking points and turn points.

15. The non-transitory storage medium according to claim 12, the method further comprises
  displaying the acquired scene images, and displaying the street view mapping of the determined route according to the acquired scene images.

* * * * *